US012316220B2

(12) United States Patent
Dwari et al.

(10) Patent No.: US 12,316,220 B2
(45) Date of Patent: May 27, 2025

(54) BI-DIRECTIONAL CONVERTER PROTECTION SYSTEMS

(71) Applicant: Hamilton Sundstrand Corporation, Charlotte, NC (US)

(72) Inventors: Suman Dwari, East Hartford, CT (US); W. Warren Chen, Glastonbury, CT (US); Lei Xing, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 309 days.

(21) Appl. No.: 18/102,010

(22) Filed: Jan. 26, 2023

(65) Prior Publication Data
US 2024/0258914 A1    Aug. 1, 2024

(51) Int. Cl.
*H02M 3/157*    (2006.01)
*H02M 1/08*    (2006.01)
*H02M 1/32*    (2007.01)

(52) U.S. Cl.
CPC ............. *H02M 3/157* (2013.01); *H02M 1/08* (2013.01); *H02M 1/32* (2013.01)

(58) Field of Classification Search
CPC ........ H02M 3/157; H02M 3/158; H02M 1/00; H02M 1/08; H02M 1/32
USPC ....................................................... 323/283
See application file for complete search history.

(56) References Cited

U.S. PATENT DOCUMENTS

| 7,573,732 | B2 | 8/2009 | Teichmann et al. |
| 10,644,609 | B2 | 5/2020 | Zhang et al. |
| 11,489,456 | B2 | 11/2022 | Fu et al. |
| 11,923,765 | B2* | 3/2024 | Szczeszynski .......... H02M 1/32 |
| 2023/0087302 | A1* | 3/2023 | Ju ....................... H02M 1/0095 307/82 |
| 2023/0412090 | A1* | 12/2023 | Abdelhamid ....... H02M 1/0025 |
| 2024/0235388 | A1* | 7/2024 | Yang ..................... H02M 3/072 |
| 2024/0250609 | A1* | 7/2024 | Concklin ................ H02M 3/07 |

FOREIGN PATENT DOCUMENTS

| CN | 104601000 A | 5/2015 |
| CN | 111835221 A | 10/2020 |
| WO | 2019039038 A1 | 2/2019 |
| WO | 2020119407 A1 | 6/2020 |

OTHER PUBLICATIONS

European Search Report dated Jul. 19, 2024 in connection with European Patent Application No. 24153874.3, 8 pages.

* cited by examiner

*Primary Examiner* — Yemane Mehari

(57) ABSTRACT

A system can include a bi-directional converter circuit comprising a plurality of switches and at least one flying capacitor. One or more the plurality of switches can experience overvoltage in a fault state. The system can include a control module operatively connected to the plurality of switches to control a state of the plurality of switches. The control module can be configured to receive a sense signal indicative of flying capacitor voltage and to control the one or more switches of the plurality of switches to turn on or remain on to prevent switch overvoltage of the one or more switches if the flying capacitor voltage is outside of a normal range.

18 Claims, 2 Drawing Sheets

BI-DIRECTIONAL CONVERTER PROTECTION SYSTEMS

STATEMENT OF GOVERNMENT RIGHTS

This invention was made with government support under contract no. DE-AR0000889 awarded by the Department of Energy. The government has certain rights in the invention.

FIELD

This disclosure relates to bi-directional converter protection systems.

BACKGROUND

A multi-level Active Neutral Point Clamp (ANPC) Converter is a bidirectional AC/DC converter. For example, a five-level ANPC topology can have several advantages compared to the traditional two-level converters such as reduced current ripple, reduced device voltage stress, less dv/dt, higher efficiency, and smaller filter size. An ANPC converter includes self-voltage-balancing capability to maintain voltage of its flying capacitor by using the bi-directional electrical branch or path connected to the neutral point. A bi-directional path in the ANPC converters is realized with semiconductor switches. In multi-level converters, such semiconductor devices may have different rating for voltages, for example. In a five-level ANPC topology, the semiconductor devices each can have different voltage stresses, and hence, different voltage ratings. Under abnormal operation conditions or fault conditions, when the flying capacitor voltage is out of regulation, overvoltage can take place on the some of the devices which may cause device breakdown and subsequent damage to the power converter subsystem and/or to the overall system.

Such conventional methods and systems have generally been considered satisfactory for their intended purpose. However, there is still a need in the art for improvements. The present disclosure provides a solution for this need.

SUMMARY

A system can include a bi-directional converter circuit comprising a plurality of switches and at least one flying capacitor. One or more the plurality of switches can experience overvoltage in a fault state. The system can include a control module operatively connected to the plurality of switches to control a state of the plurality of switches. The control module can be configured to receive a sense signal indicative of flying capacitor voltage and to control the one or more switches of the plurality of switches to turn on or remain on to prevent switch overvoltage of the one or more switches if the flying capacitor voltage is outside of a normal range.

For example, the control module can be configured to determine if the flying capacitor voltage is low, and to control the one or more switches of the plurality of switches to turn on or remain on after low flying capacitor voltage is detected. Any suitable flying capacitor high voltage or low voltage threshold control scheme is contemplated herein.

In certain embodiments, the control module can include a sum block configured to compare a target flying capacitor voltage to the flying capacitor voltage indicated by the sense signal to output an error voltage. In certain embodiments, the control module can include a logic signal generator module configured to receive the error signal and to determine a control signal for each switch. The control module, e.g., the logic signal generator module, can be configured to receive one or more other sensor signals to determine a context of operation to prevent protection control in a transient context.

In certain embodiments, the plurality of switches can include a first switch, a second switch, a third switch, a fourth switch, a fifth switch, a sixth switch, a seventh switch, and an eighth switch. The first switch and the second switch can be connected to a neutral point in parallel. The first switch, the seventh switch, and the third switch can be connected to a first side (e.g., a positive side) of the flying capacitor in parallel. The second switch, the eighth switch, and the sixth switch can be connected to a second side (e.g., a negative side) of the flying capacitor in parallel. The fourth switch can be disposed in series with the third switch and oriented in reverse. The fifth switch can be disposed in series with the sixth switch and oriented in reverse. The fourth switch and the fifth switch can be connected in parallel to a midpoint between a first DC capacitor and a second DC capacitor.

In certain embodiments, the control module can be configured to determine which switches to turn on or leave on based on whether the flying capacitor voltage is above or below the normal range. For example, the control module can be configured to turn on or leave on the fourth switch and sixth switch if the flying capacitor voltage is below the normal range.

In accordance with this disclosure, an active neutral point converter (ANPC) system can include any suitable system disclosed herein. For example, the ANPC system can include multi-level topology. Any suitable number of levels (e.g., five) is contemplated herein.

In accordance with at least one aspect of this disclosure, a non-transitory computer readable medium, comprising computer executable instructions configured to cause a computer to perform a method. The method can include receiving a sense signal indicative of at least one flying capacitor voltage of each flying capacitor, determining whether the flying capacitor voltage is outside of a normal range, and controlling one or more switches of a plurality of switches associated with the flying capacitor to turn on or remain on if the flying capacitor voltage is outside of the normal range to protect the one or more switches. In certain embodiments, the method can include closing or keeping closed the remaining switches of the plurality of switches.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
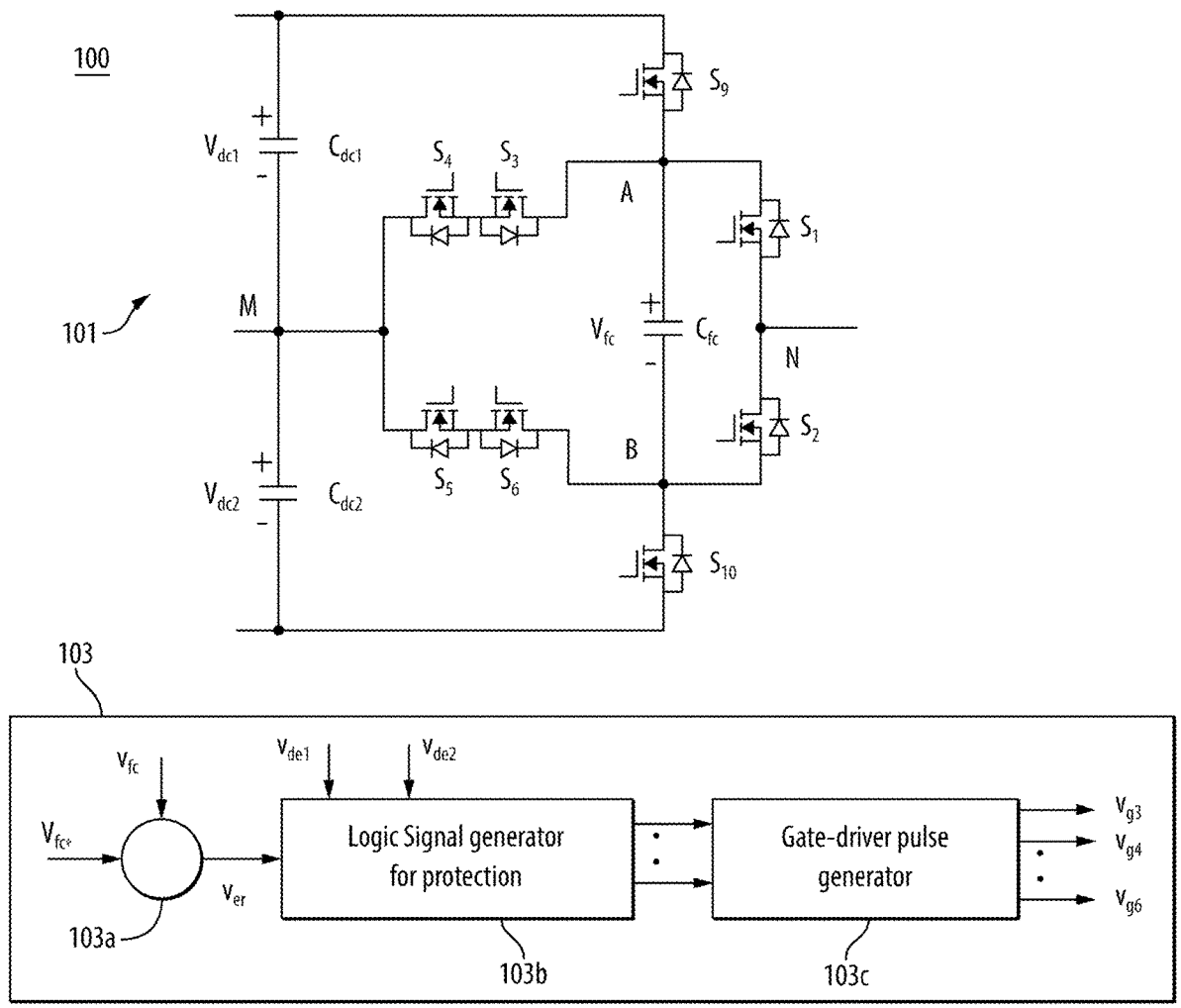
FIG. 1 is a schematic diagram of an embodiment of a system in accordance with this disclosure.
Figure 2:
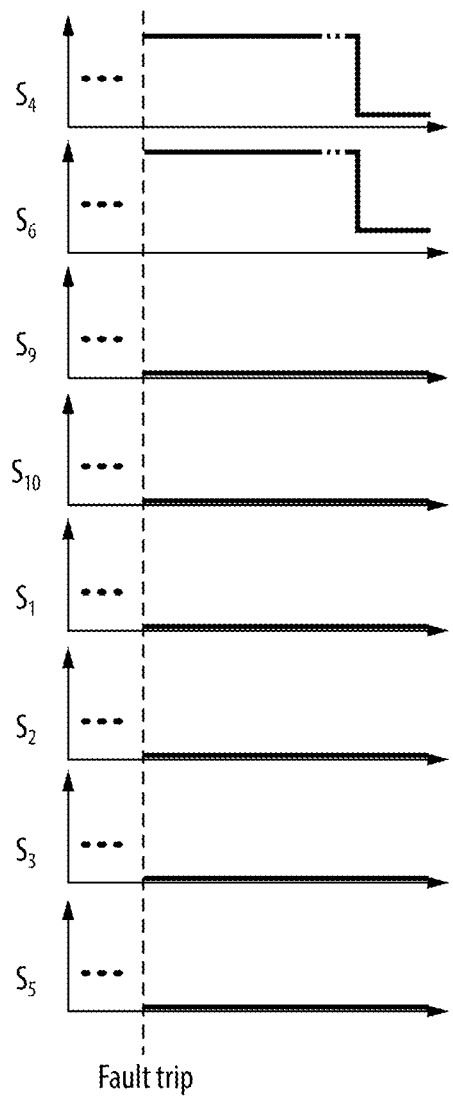
FIG. 2 shows an embodiment of gate driver pulses under fault condition for the embodiment of FIG. 1 in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to regulate flying capacitor voltage, e.g., for an active neutral point clamp (ANPC) converter.

Referring to FIG. 1, a system 100 can include a bi-directional converter circuit 101 comprising a plurality of switches S1, S2, S3, S4, S5, S6, S9, S10, and at least one flying capacitor $C_{fc}$. One or more the plurality of switches (e.g., switch S4 and switch S6) can experience overvoltage in a fault state.

The system 100 can include a control module 103 operatively connected to the plurality of switches S1, S2, S3, S4, S5, S6, S9, S10 to control a state of the plurality of switches S1, S2, S3, S4, S5, S6, S9, S10. The control module 103 can be configured to receive a sense signal indicative of flying capacitor voltage Vfc and to control the one or more switches (e.g., switch S4 and S6) of the plurality of switches S1, S2, S3, S4, S5, S6, S9, S10 to turn on or remain on to prevent switch overvoltage of the one or more switches (e.g., switch S4 and S6) if the flying capacitor voltage Vfc is outside of a normal range (e.g., low or high).

For example, the control module 103 can be configured to determine if the flying capacitor voltage Vfc is low, and to control the one or more switches (e.g., switch S4 and S6) of the plurality of switches S1, S2, S3, S4, S5, S6, S9, S10 to turn on or remain on after low flying capacitor voltage Vfc is detected. Any suitable flying capacitor high voltage or low voltage threshold control scheme is contemplated herein.

In certain embodiments, the control module 103 can include a sum block 103a configured to compare a target flying capacitor voltage $V_{fc}^*$ to the flying capacitor voltage $V_{fc}$ indicated by the sense signal to output an error voltage $V_{er}$. In certain embodiments, the control module 103 can include a logic signal generator module 103b configured to receive the error signal $V_{er}$ and to determine a control signal for each switch S1, S2, S3, S4, S5, S6, S9, S10. The control module 103, e.g., the logic signal generator module 103b of the control module 103, can be configured to receive one or more other sensor signals (e.g., capacitor voltages $V_{dc1}$ and $V_{dc2}$) to determine a context of operation to prevent protection control in a transient context (e.g., during start up). In certain embodiments, the sense signal indicative of flying capacitor voltage $V_{fc}$ can be input directly to the logic signal generator module 103b without the need for a separate sum block, for example. In certain embodiments, the sum block 103a can be part of the logic signal generator module 103b, for example.

As shown, the logic signal generator module 103b can be operatively connected to a gate driver pulse generator module 103c to output one or more switch control signals to the gate driver pulse generator module 103c. The gate driver pulse generator module 103c can be connected to each switch and can provide a pulse width modulated (PWM) signal or other suitable signal type to control the state of each switch based on the switch control signals from the logic signal generator module 103b.

In certain embodiments, as shown in circuit 101, the plurality of switches S1, S2, S3, S4, S5, S6, S9, S10 can include a first switch S1, a second switch S2, a third switch S3, a fourth switch S4, a fifth switch S5, a sixth switch S6, a seventh switch S9 and an eighth switch S10. The eight switches can be arranged as shown in FIG. 1, for example.

Other suitable converter switch amounts and arrangements are contemplated herein. The first switch S1 and the second switch S2 can be connected to a neutral point N in parallel. The first switch S1, the seventh switch S9, and the third switch S3 can be connected to a first side (e.g., a positive side) of the flying capacitor $C_{fc}$ in parallel. The second switch S2, the eighth switch S10, and the sixth switch S6 can be connected to a second side (e.g., a negative side) of the flying capacitor $C_{fc}$ in parallel. The fourth switch S4 can be disposed in series with the third switch S3 and oriented in reverse (e.g., with diodes in the reverse direction). The fifth switch S5 can be disposed in series with the sixth switch S6 and oriented in reverse (e.g., with diodes in the reverse direction). The fourth switch S4 and the fifth switch S5 can be connected in parallel to a midpoint M between a first DC capacitor $C_{dc1}$ and a second DC capacitor $C_{dc2}$.

In certain embodiments, the control module 103 can be configured to determine which switches to turn on or leave on based on whether the flying capacitor voltage $V_{fc}$ is above or below the normal range. For example, the control module 103 can be configured to turn on or leave on the fourth switch S4 and sixth switch S6 if the flying capacitor voltage $V_{fc}$ is below the normal range. The control module 103 can determine what the fault condition is and can determine (e.g., using a look-up table or other suitable database) which switches will experience an overvoltage as a result of the fault condition (and/or traditional switch shutdown). For example, in the case of low flying capacitor voltage $V_{fc}$ in the circuit 101 as shown, the switches S4 and S6 would experience overvoltage (e.g., in accordance with Table 1 disclosed below) if all switches were simply turned off as an attempted fault protection measure. Therefore, the control module 103 can be configured to turn on or leave on the switches S4 and S6 to prevent overvoltage of the switches, e.g., as shown in FIG. 2.

The system 100 can include one or more voltage sensors configured to sense the voltage of the flying capacitor $C_{fc}$ and/or any other capacitors in the system, e.g., capacitors $V_{dc1}$ and $V_{dc2}$. The sensors can be operatively connected to the control module 103, for example, to provide the sense signal to the control module 103. Any other suitable sensors are contemplated herein.

In accordance with this disclosure, an active neutral point converter (ANPC) system can include any suitable system disclosed herein. For example, the ANPC system can include multi-level topology. Any suitable number of levels (e.g., five) is contemplated herein.

In accordance with at least one aspect of this disclosure, a non-transitory computer readable medium, comprising computer executable instructions configured to cause a computer to perform a method. The method can include receiving a sense signal indicative of a flying capacitor voltage $V_{fc}$ of each flying capacitor $C_{fc}$, determining whether the flying capacitor voltage $V_{fc}$ is outside of a normal range, and controlling one or more switches (e.g., switch S4 and S6) of a plurality of switches S1, S2, S3, S4, S5, S6, S9, S10 associated with the flying capacitor $C_{fc}$ to turn on or remain on if the flying capacitor voltage $V_{fc}$ is outside of the normal range to protect the one or more switches (e.g., switch S4 and S6). In certain embodiments, the method can include closing or keeping closed the remaining switches S1, S2, S3, S5, S9, S10 of the plurality of switches S1, S2, S3, S4, S5, S6, S9, S10.

Embodiments can include a protection scheme that can protect circuit components from overvoltage and potential damage under fault conditions. Traditionally, when a converter system has a fault, it turns off all switches, but this causes overvoltage at switches S4 and S6 in the topology as shown in FIG. 1. Embodiments can either turn on or leave on those switches that would be in overvoltage state. Once fault condition is gone, all switches can be turned off, for example.

Embodiments can be applicable to all 5-level ANPC topologies as well to other multi-level active neutral point converters. Embodiments include a type of ANPC converter, as shown in FIG. 1, as an example. The ANPC converter topology can be realized by using eight semiconductor switching devices and three capacitors, e.g., as shown in FIG. 1. The voltage stresses on these devices are listed in Table 2, which is mainly decided by voltage of the capacitors. Under normal conditions, the converter operates with balanced and regulated capacitor voltage, $V_f=U/4$, $V_{dc1}=V_{dc2}=U/2$, where U is the DC input voltage of the converter. In certain embodiments, 50% voltage margin over normal voltage, devices with different voltage ratings can be selected as shown in Table 1 below.

Under abnormal conditions, especially when the flying capacitor voltage $V_{fc}$ drops to a much significantly lower value the normal operating condition, the voltage stress on S9, S10, S4 and S6 will increase assuming $V_{dc1}$ and $V_{dc2}$ are constant. For example, in a worst case, $V_{fc}=0$, the voltage stress on S4 and S6 will increase to U/2, which exceeds the voltage rating of the device (e.g., in the embodiment as listed in Table 1) and can cause device breakdown. Meanwhile the voltage stress on S9 and S10 will increase to U. Under such circumstances, the converter will be failed without proper control and design selections.

TABLE 1

Example device voltage stress and voltage rating

| Device | Voltage stress | Nominal voltage (Normal condition: $V_{dc1}=V_{dc2}=$ U/2, $V_f=$ U/4) | Voltage rating (50% over nominal voltage) | Voltage stress under fault condition ($V_{dc1}=V_{dc2}=$ U/2, $V_{fc}=0$) |
|---|---|---|---|---|
| S1, S2 | $V_{fc}$ | U/4 | 3U/8 | 0 |
| S9, S10 | $V_{dc1} + V_{dc2} - V_f$ | 3U/4 | 9U/8 | U |
| S3 | $V_{dc1}$ | U/2 | 3U/4 | U/2 |
| S5 | $V_{dc2}$ | U/2 | 3U/4 | U/2 |
| S4 | $V_{dc2} - V_f$ | U/4 | 3U/8 | U/2 |
| S6 | $V_{dc1} - V_f$ | U/4 | 3U/8 | U/2 |

As per the conventional control, all the switching devices are turned off when a fault is detected. For example, per the conventional control, all the gate signals are lowered to turn off the devices as soon as the fault is detected. Such a conventional protection scheme fails protect some of the devices, e.g., S4 and S6 in this case, since the devices will encounter overvoltage leading to device and converter failure. For example, the current can flow through the body diode of S10, S4 causing a higher voltage stress of U/2 across them above their nominal operation voltage.

However, embodiments can provide a protection scheme that limits the voltage stress of the devices (e.g., the switches) within their design limits. This can allow a smaller and lighter switch to be used, for example, to provide the same power capabilities. For example, embodiments can sense voltage across the flying capacitor and the DC link capacitors, and these values can be compared with their normal design values or reference voltage levels. The error information from a comparison block can be provided to a logic signal generator module, which processes the error information to detect any abnormal voltage condition across any devices and generate a new set of gate pulses to drive the power semiconductor switches and to operate them under safe operating voltage limits. As shown in FIG. 2, for example, S4 and S6 can be turned on after the fault is detected by the control module shown in FIG. 1 and the other switches can be turned off to stop the converter operation. The appropriate switches, in this case S4 and S6, can be kept on until the comparison block and the logic signal generator unit sense and determine that the operating conditions of the converter switches have reached safe voltage conditions. If there is persistent fault, the logic signal generator and the gate-driver pulse generator can turn off all the devices after a predetermined time limit. If the fault condition is not persistent, then the logic signal generator and the gate-driver pulse generator can allow the converter to revert to normal operation. Thus, using embodiments, the overvoltage on S4 and S6, and other switches can be mitigated and can be protected under fault conditions.

Certain embodiments can address the practical challenges of ANPC converter to protect and operate the semiconductor switches from overvoltage faults when the converter is under fault conditions, such as when the flying capacitor voltage drops to a low-level during operation. The proposed protection and control scheme can enable realization of the benefits of an ANPC converter to enable a multi-level converter with reduced voltage rating high performance semiconductor devices, and hence, to realize a high-performance power converter though the benefits of ANPC converter, such as high power density, low mass and volume, high efficiency, high power quality, low EMI, high switching frequency operation, and fault tolerant operations. Certain embodiments do not require additional components to realize high density, efficient, low cost solution with high reliability. Certain embodiments of a protection scheme implementation do not require additional hardware, which can enable low cost implementation.

Embodiments (e.g., including any suitable module disclosed above herein) can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:
a bi-directional converter circuit comprising a plurality of switches and at least one flying capacitor, wherein one or more of the plurality of switches experiences overvoltage in a fault state; and
a control module operatively connected to the plurality of switches to control a state of the plurality of switches, wherein the control module is configured to receive a sense signal indicative of flying capacitor voltage and to control the one or more switches of the plurality of switches to turn on or remain on to prevent switch overvoltage of the one or more switches if the flying capacitor voltage is outside of a normal range.

2. The system of claim 1, wherein the control module is configured to determine if the flying capacitor voltage is low, and to control the one or more switches of the plurality of switches to turn on or remain on after low flying capacitor voltage is detected.

3. The system of claim 1, wherein the control module includes a sum block configured to compare a target flying capacitor voltage to the flying capacitor voltage indicated by the sense signal to output an error voltage.

4. The system of claim 3, wherein the control module includes a logic signal generator module configured to receive the error voltage and to determine a control signal for each switch.

5. The system of claim 4, wherein the control module is configured to receive one or more other sensor signals to determine a context of operation to prevent protection control in a transient context.

6. The system of claim 5, wherein the plurality of switches includes a first switch, a second switch, a third switch, a fourth switch, a fifth switch, a sixth switch, a seventh switch, and an eighth switch, wherein the first switch and the second switch are connected to a neutral point in parallel, wherein the first switch, the seventh switch, and the third switch are connected to a first side of the at least one flying capacitor in parallel, wherein the second switch, the eighth switch, and the sixth switch are connected to a second side of the at least one flying capacitor in parallel, wherein the fourth switch is disposed in series with the third switch and oriented in reverse, wherein the fifth switch is disposed in series with the sixth switch and oriented in reverse, wherein the fourth switch and the fifth switch are connected in parallel to a midpoint between a first DC capacitor and a second DC capacitor.

7. The system of claim 6, wherein the control module is configured to determine which switches to turn on or leave on based on whether the flying capacitor voltage is above or below the normal range.

8. The system of claim 7, wherein the control module is configured to turn on or leave on the fourth switch and the sixth switch if the flying capacitor voltage is below the normal range.

9. An active neutral point converter system, comprising:
a bi-directional converter circuit comprising a plurality of switches and at least one flying capacitor, wherein one or more of the plurality of switches experiences overvoltage in a fault state; and
a control module operatively connected to the plurality of switches to control a state of the plurality of switches, wherein the control module is configured to receive a sense signal indicative of flying capacitor voltage and to control the one or more switches of the plurality of switches to turn on or remain on to prevent switch overvoltage of the one or more switches if the flying capacitor voltage is outside of a normal range.

10. The system of claim 9, wherein the control module is configured to determine if the flying capacitor voltage is low, and to control the one or more switches of the plurality of switches to turn on or remain on after low flying capacitor voltage is detected.

11. The system of claim 9, wherein the control module includes a sum block configured to compare a target flying capacitor voltage to the flying capacitor voltage indicated by the sense signal to output an error voltage.

12. The system of claim 11, wherein the control module includes a logic signal generator module configured to receive the error voltage and to determine a control signal for each switch.

13. The system of claim 12, wherein the control module is configured to receive one or more other sensor signals to determine a context of operation to prevent protection control in a transient context.

14. The system of claim 13, wherein the plurality of switches includes a first switch, a second switch, a third switch, a fourth switch, a fifth switch, a sixth switch, a seventh switch, and an eighth switch, wherein the first switch and the second switch are connected to a neutral point in parallel, wherein the first switch, the seventh switch, and the third switch are connected to a first side of the at least one flying capacitor in parallel, wherein the second switch, the eighth switch, and the sixth switch are connected to a second side of the at least one flying capacitor in parallel, wherein the fourth switch is disposed in series with the third switch and oriented in reverse, wherein the fifth switch is disposed in series with the sixth switch and oriented in reverse, wherein the fourth switch and the fifth switch are connected in parallel to a midpoint between a first DC capacitor and a second DC capacitor.

15. The system of claim 14, wherein the control module is configured to determine which switches to turn on or leave on based on whether the flying capacitor voltage is above or below the normal range.

16. The system of claim 15, wherein the control module is configured to turn on or leave on the fourth switch and the sixth switch if the flying capacitor voltage is below the normal range.

17. A non-transitory computer readable medium comprising computer executable instructions configured to cause a computer to perform a method, the method comprising:
receiving a sense signal indicative of at least one flying capacitor voltage of a flying capacitor;
determining whether the at least one flying capacitor voltage is outside of a normal range; and
controlling one or more switches of a plurality of switches associated with the flying capacitor to turn on or remain on if the at least one flying capacitor voltage is outside of the normal range to protect the one or more switches.

18. The non-transitory computer readable medium of claim 17, wherein the method includes closing or keeping closed remaining switches of the plurality of switches.

* * * * *